US010289460B2

(12) United States Patent
Drollinger et al.

(10) Patent No.: US 10,289,460 B2
(45) Date of Patent: May 14, 2019

(54) SYSTEM INTEGRATION USING CONFIGURABLE DATAFLOW

(71) Applicant: Microsoft Technology Licensing, LLC, Redmond, WA (US)

(72) Inventors: Robert Aron Drollinger, Redmond, WA (US); Joern Lindhard Mortensen, Redmond, WA (US); Savio Mendes De Figueiredo, Redmond, WA (US); Krishna Kannan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 16 days.

(21) Appl. No.: 15/447,768

(22) Filed: Mar. 2, 2017

(65) Prior Publication Data
US 2018/0136989 A1 May 17, 2018

Related U.S. Application Data

(60) Provisional application No. 62/422,306, filed on Nov. 15, 2016.

(51) Int. Cl.
*G06F 9/54* (2006.01)
(52) U.S. Cl.
CPC .............. *G06F 9/542* (2013.01); *G06F 9/546* (2013.01)
(58) Field of Classification Search
CPC ................................. G06F 9/542; G06F 9/546
See application file for complete search history.

(56) References Cited

U.S. PATENT DOCUMENTS

| 6,694,374 B1 | 2/2004 | McGloin et al. |
| 7,290,003 B1 | 10/2007 | Tong |
| 7,505,983 B2 | 3/2009 | Wildhagen et al. |
| 7,802,230 B1 | 9/2010 | Mendicino et al. |

(Continued)

FOREIGN PATENT DOCUMENTS

| WO | 2002039353 A1 | 5/2002 |
| WO | 2003017150 A2 | 2/2003 |

OTHER PUBLICATIONS

"Base CRM Integration", http://launchpoint.marketo.com/bedrock-data-inc/1744-base-crm-marketo-integration/, Retrieved on: Dec. 1, 2016, 4 pages.
"SAP ERP and Third-Party Integration", http://help.sap.com/saphelp_epc20/helpdata/en/e4/d9357c688749839c8ee39178c2d81f/content.htm?frameset=ten/09/aldb4b3e524a62a845509d006374a5/frameset.htm, Retrieved on: Dec. 1, 2016, 2 pages.

(Continued)

*Primary Examiner* — Charles E Anya
(74) *Attorney, Agent, or Firm* — Mannava & Kang, P.C.

(57) ABSTRACT

A system generates a first data set by executing, in response to occurrence of an event, a data flow configured with a property of a first object of a first data processing system to map the first object to a second object of a second data processing system. The system acquires additional information, including additional properties of the first object and data used by the first and second data processing systems to communicate with other data processing systems, from the first and second data processing systems to map the first object to the second object. The system generates a second data set having a format compatible with the second data processing system based on the first data set and the additional information and sends the second data set to the second data processing system. The system maps other objects using reconfigured data flows.

18 Claims, 9 Drawing Sheets

(56) References Cited

U.S. PATENT DOCUMENTS

| | | | |
|---|---|---|---|
| 8,307,109 B2* | 11/2012 | Mamou | G06F 17/30563 709/203 |
| 8,935,314 B2 | 1/2015 | Ravichandran et al. | |
| 9,049,245 B2* | 6/2015 | Higgins | H04L 67/2814 |
| 9,063,748 B1 | 6/2015 | Bakale et al. | |
| 9,129,035 B2 | 9/2015 | Merritt | |
| 2004/0044766 A1* | 3/2004 | Pauly | G06F 17/30569 709/225 |
| 2007/0214171 A1 | 9/2007 | Behnen et al. | |
| 2007/0244876 A1 | 10/2007 | Jin et al. | |
| 2009/0119416 A1* | 5/2009 | Sirdevan | G06Q 10/06 709/246 |
| 2015/0081761 A1 | 3/2015 | Deshpande et al. | |
| 2016/0314143 A1* | 10/2016 | Hiroshige | G06F 17/30563 |

OTHER PUBLICATIONS

"Sun Master Data Management Suite Primer", https://docs.oracle.com/cd/E19509-01/820-5699/capssmidxbrdext_intro/index.html, Published on: 2010, 24 pages.

"Introduction to Salesforce Connect", https://trailhead.salesforce.com/en/lightning_connect/lightning_connect_introduction, Published on: 2000, 7 pages.

"Atdec Integrating Magento eCommerce with CRM and ERP to generate accurate, real-time visibility", https://www.scribesoft.com/cases/atdec-integrating-magento-ecommerce-crm-erp-generate-accurate-real-time-visibility/, Retrieved on: Dec. 1, 2012, 7 pages.

"International Search Report and Written Opinion Issued in PCT Application No. PCT/US2017/060730", dated Feb. 13, 2018, 11 pages.

* cited by examiner

Set Custom Step Input Properties – Microsoft Dynamics 365 -- Webpage Dialog

? Help ▼

Process: Create Glympse Agent for Bookable Resource
Set Custom Step Input Properties

Working on solution: Default Solution

| Property Name | Data Type | Required | Value |
|---|---|---|---|
| Bookable Resource | Lookup | Required | (Bookable Resource(Bookable Resource) |
| Load User Image as Agent Avatar | Two Options | Optional | ○ False  ● True |
| Agent Name | Single Line of Text | Required | {Full Name(User (User))} |
| Agent E-Mail | Single Line of Text | Required | {Primary Email(User)} |

Form Assistant

Dynamic Values

Dynamic Values

Look for:

Bookable Resource

Local intranet | Protected Mode: Off

FIG. 3

Process: Create Glympse Agent for Bookable Resource – Microsoft Dynamics 365 – Internet Explorer File ⊠ Close  ⊡|⊙|⊙ Deactivate | ⊡ Show Dependencies  ⊡ Actions ▼

? Help ▼

Process: Create Glympse Agent for Bookable Resource
Information

Working on solution: Default Solution

◀ Common
  ☐ Information
  ☐ Audit History
◀ Process Sessions
  ☐ Process Sessions General | Administration | Notes ▼ Hide Process Properties Process Name*  [Create Glympse Agent for Bookable Res]    Entity     [Bookable Resource]
Activate As    [Process          ⌄]                       Category   [Workflow]

Available to Run                                      Options for Automatic Processes
☑ Run this workflow in the background (recommended)       Scope      [Organization    ⌄]
☐ As an on-demand process                                 Start when: ☑ Record is created
☐ As a child process                                      ☐ Record status changes
                                                          ☐ Record is assigned
Workflow Job Retention                                ☑ Record fields change  View
☑ Automatically delete completed workflow jobs (to save disk space)   ☐ Record is deleted ● Create Glympse Agent record for Bookable Resource from User
  GlympseCreate Glympse Agent for Bookable Resource  View properties

FIG. 4

SYSTEM INTEGRATION USING CONFIGURABLE DATAFLOW

CROSS-REFERENCE TO RELATED APPLICATIONS

This application claims the benefit of U.S. Provisional Application No. 62/422,306, filed on Nov. 15, 2016. The entire disclosure of the application referenced above is incorporated herein by reference.

FIELD

The present disclosure relates generally to data processing systems and more particularly to integrating data processing systems using configurable dataflow.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In an enterprise computing environment, a first data processing system running in an enterprise may need to communicate, interface, and exchange data with a second data processing system running outside the enterprise. The first and second data processing system (systems) may use different data formats, interfaces, and signatures (data that is mandatory for making API calls, for example). Accordingly, integrating the two systems can be challenging. Further, integrating more than one system from the enterprise with one or more systems outside the enterprise can be further challenging.

SUMMARY

A system comprises a processor and memory, and machine readable instructions stored in the memory, when executed by the processor, configured to generate a first data set by executing, in response to occurrence of an event, a data flow configured with a property of a first object of a first data processing system to map the first object to a second object of a second data processing system. The machine readable instructions are further configured to generate a second data set having a format compatible with the second data processing system based on the first data set, send the second data set to the second data processing system, and map a third object of the first data processing system to a fourth object of the second data processing system based on a reconfigured data flow.

In other features, the machine readable instructions are further configured to acquire additional information from the first data processing system, the second data processing system, or the first and second data processing systems to map the first object to the second object, and generate the second data set based on the first data set and the additional information.

In other features, the machine readable instructions are further configured to retry a failed communication with the second data processing system.

In other features, the machine readable instructions are further configured to acquire additional information including additional properties of the first object and data used by the first and second data processing systems to communicate with other data processing systems.

In other features, the machine readable instructions are further configured to generate a first plurality of data sets by executing a plurality of data flows in an order, generate a second plurality of data sets by processing the first plurality of data sets in the order, and send the second plurality of data sets to the second data processing system in the order.

In other features, the machine readable instructions are further configured to map a fifth object of the first data processing system to a sixth object of a third data processing system using the reconfigured data flow.

In other features, the machine readable instructions are further configured to map a fifth object of a third data processing system to a sixth object of the second data processing system using the reconfigured data flow.

In other features, the machine readable instructions are further configured to map a fifth object of a third data processing system to a sixth object of a fourth data processing system using the reconfigured data flow.

In still other features, a method comprises generating a first data set by executing, in response to occurrence of an event, a data flow configured with a property of a first object of a first data processing system to map the first object to a second object of a second data processing system. The method further comprises generating a second data set having a format compatible with the second data processing system based on the first data set, sending the second data set to the second data processing system, and mapping a third object of the first data processing system to a fourth object of the second data processing system based on a reconfigured data flow.

In other features, the method further comprises acquiring additional information from the first data processing system, the second data processing system, or the first and second data processing systems to map the first object to the second object, and generating the second data set based on the first data set and the additional information.

In other features, the method further comprises acquiring additional information including additional properties of the first object and data used by the first and second data processing systems to communicate with other data processing systems.

In other features, the method further comprises retrying a failed communication with the second data processing system.

In other features, the method further comprises generating a first plurality of data sets by executing a plurality of data flows in an order, generating a second plurality of data sets by processing the first plurality of data sets in the order, and sending the second plurality of data sets to the second data processing system in the order.

In other features, the method further comprises mapping a fifth object of the first data processing system to a sixth object of a third data processing system using the reconfigured data flow.

In other features, the method further comprises mapping a fifth object of a third data processing system to a sixth object of the second data processing system using the reconfigured data flow.

In other features, the method further comprises mapping a fifth object of a third data processing system to a sixth object of a fourth data processing system using the reconfigured data flow.

In still other features, a first server is configured to host a first data processing system and to communicate with a second server hosting a second data processing system. The first server comprises a processor and memory, and machine readable instructions stored in the memory, when executed by the processor, configured to generate a first data set by executing, in response to occurrence of an event, a data flow configured with a property of a first object of the first data processing system to map the first object to a second object of the second data processing system. The machine readable instructions of the first server are further configured to acquire additional information from the first data processing system, the second data processing system, or the first and second data processing systems to map the first object to the second object, the additional information including additional properties of the first object and data used by the first and second data processing systems to communicate with other data processing systems. The machine readable instructions of the first server are further configured to generate a second data set having a format compatible with the second data processing system based on the first data set and the additional information. The machine readable instructions of the first server are further configured to send the second data set to the second data processing system, and map a third object of the first data processing system to a fourth object of the second data processing system based on a reconfigured data flow.

In other features, the machine readable instructions of the first server are further configured to retry a failed communication with the second data processing system.

In other features, the machine readable instructions of the first server are further configured to generate a first plurality of data sets by executing a plurality of data flows in a sequential order, generate a second plurality of data sets by processing the first plurality of data sets in the sequential order, and send the second plurality of data sets to the second data processing system in the sequential order.

In other features, the machine readable instructions of the first server are further configured to map objects of the first data processing system and a third data processing system to objects of the second data processing system and a fourth data processing system using the reconfigured data flow.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 3 shows an example of configuring a data flow to map an object of a business application of an enterprise to an object of an external system according to the present disclosure.

FIG. 4 shows an example of a manner in which a user of the business application can configure when and how to execute a data flow according to the present disclosure.

In the drawings, reference numbers may be reused to identify similar and/or identical elements.

DESCRIPTION

Figure 1:
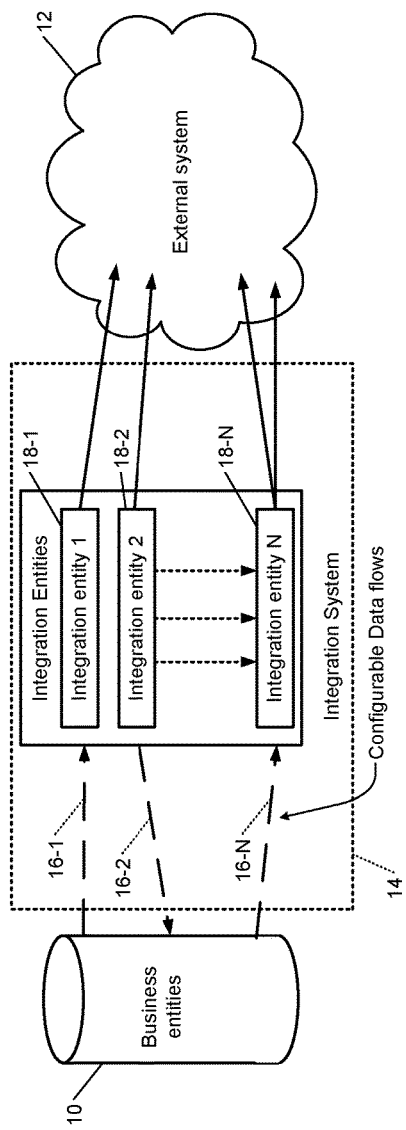
FIG. 1 shows a data flow diagram of an integration system comprising configurable data flows and modular integration entities according to the present disclosure.

The present disclosure relates to novel integration systems and methods for integrating different data processing systems (also referred to herein as systems, software applications, or applications). As explained below in detail, an integration system according to the present disclosure includes one or more configurable data flows (such as workflows) and one or more modular integration entities. An entity, also called an object, is a collection of properties, attributes, or features that describe the entity and that are grouped under the entity. The data flows are used to map objects from one system to another (e.g., from a backend system in an enterprise (source system) to a system external to the enterprise (a target system). The data flows can be configured to map objects from the source system to objects from the target system using minimum information (e.g., properties) with which users of the source application are already familiar.

These data flows are executed upon occurrence of one or more selected events to generate data sets. The data sets are queued in the order in which the data sets are generated for further processing. The processing of a data set is triggered when the data set is queued. The processing includes communicating with the source and target systems, obtaining additional information (e.g., properties, signatures, etc.) for completing the mapping and generating resulting data sets, converting the resulting data sets to a format used by the target system, and sending the formatted data sets to the target system.

The integration system according to the present disclosure is designed to work seamlessly with minimal coupling to the source and target systems since the data flows are configurable and since the modular integration entities perform most of the functions to facilitate communication and integration between the source and target systems. The configurable data flows and the modular integration entities can be used to integrate one or more source systems within an enterprise to one or more target systems outside the enterprise. These and other aspects of the present disclosure are described below in detail.

Integrating two different systems (e.g., a source system within an enterprise and a target system external to the enterprise mentioned above) can be challenging when the two systems have different concepts, purposes, or intents, that can result in differing entity and communication signatures (data that is mandatory for making API calls, for example). Accordingly, the two systems may be integrated using one of two approaches: A first approach includes a tightly-coupled implementation. A second approach includes a flexible implementation with a heavyweight mapping system (i.e., implementing extensive mapping utilizing a specialized external system). Both approaches are discussed below in detail.

In contrast, the present disclosure uses a different approach that utilizes an easy-to-use workflow system to configure which actions, when performed on what data, should result in the integration of what other data. The approach according to the present disclosure provides an easy-to-use, lightweight, and configurable modular integration system that is also flexible, extensible (portable), and reusable as described below in detail.

The first approach involves writing custom code that is tailored specifically to interface the two disparate systems. The first approach can be relatively simple to implement, but has many drawbacks. The first approach is simple since the approach is logical and only involves converting the signatures from one system to another. Unfortunately, however, if an additional system or object from the enterprise needs to be integrated with the external target system, the integration process needs to be re-implemented, and new custom code needs to be written to interface the additional system or object with the external target system. The need to re-implement the integration process makes the first approach fragile, difficult to maintain, and difficult to extend to other systems. The first approach will likely also require recompiling any code changes in the event of any updates. Consequently, the first approach is unusable by new systems that may be acquired or brought into service by the enterprise in the future.

An example of the first approach in a Dynamics 365 environment (used only as an example throughout the present disclosure) may include writing workflow activities (code in workflow) or plugins that are triggered when a change occurs in one or more objects due to a create, update, read, or delete operation performed on records associated with the objects. In the first approach, the implementation of the integration system would be tightly-coupled to the system, and any change in signatures on either side (the system within the enterprise and/or the external system) would require the integration system code to be re-written, re-compiled, up-versioned, re-signed, re-deployed, etc. In contrast, according to the approach of the present disclosure, any change in signatures on either side can be handled by a simple configuration update during runtime (requiring no system downtime) by changing the workflow feeding into the integration system.

An example of a further drawback would be if, at a later time, the user wants to repeat the implementation for other entities, additional and different code would have to be written for those entities. In contrast, according to the approach of the present disclosure, all that needs to be done is to create an additional workflow and link the additional workflow to the integration entities (again, while the system remains running).

Throughout the present disclosure, Dynamics 365 is used as an example of a business application or a business system, and Glympse is used as an example of an external system for illustrative purposes only. The teachings of the present disclosure are not limited to Dynamics 365 and Glympse. Rather, the teachings of the present disclosure can be applied to integrate any data processing system with any data processing system.

The second approach involves configuring a heavyweight mapping tool to handle the mapping and communication with an external server that hosts the external system. In the second approach, the mapping tool can be hosted by a third party external to the enterprise. An example of the second approach is Microsoft BizTalk Server (one additional example may be MS Flow). For example, some partners and customers may use BizTalk (or MS Flow) to integrate Dynamics 365 with other external systems. The second approach has several disadvantages. For example, the second approach can require complex configuration with a learning curve to be able to correctly map the fields of a source system to a target system. Further, the second approach would add an additional point of failure, system dependency, management overhead, an additional component to maintain and monitor, and additional potential cost/licensing/etc. to the solution. Furthermore, the use of an external tool like BizTalk (or MS Flow) can also heavily impact performance since data must pass through an intermediate, yet external system before communicating with third parties, which can incur additional processing overhead, or latency. In contrast, the approach according to the present disclosure has none of these drawbacks.

The present disclosure is organized as follows. The systems and methods of the present disclosure are explained with reference to FIGS. 1-5C. Examples of additional configurations of the systems and methods according to the present disclosure are explained with reference to FIG. 6. A simplistic example of a distributed environment in which the systems and methods of the present disclosure can be implemented is presented and described with reference to FIGS. 7-9. The systems and methods of the present disclosure are further explained with reference to FIG. 10.

Throughout the disclosure, the terms entity and object are used interchangeably; and the terms system, application, software program, and data processing system are also used interchangeably. Further, the business entities shown in the figures and described throughout the disclosure using the reference numeral 10 refer to a business application or a business system (e.g., Dynamics 365), or to a set of business entities of a business application or a business system (e.g., Dynamics 365). As such, an individual business entity (e.g., a Bookable Resource shown in the figures and described throughout the disclosure) represents an entity or an object of a business application or a business system, and not the business application or the business system itself.

FIG. 1 shows a data flow diagram of an integration system comprising configurable data flows and modular integration entities according to the present disclosure. One or more business entities 10 (e.g., one or more data processing systems) within an enterprise may communicate with an external system 12 using an integration system 14 according to the present disclosure. The integration system 14 may include one or more configurable data flows 16-1, 16-2, . . . 16-N (collectively configurable data flows 16 or data flows 16) and one or more integration entities 18-1, 18-2, . . . 18-N (collectively integration entities or integration objects 18), where N is an integer greater than or equal to 1.

While N is used in the notation of both the data flows 16 and the integrations entities 18, the number of data flows 16 and integrations entities 18 in the integration system 14 need not be equal. Further, the data flows 16 and the integrations entities 18 may not have a one-to-one correspondence. Multiple data flows 16 may work with a single integration entity 18, and one data flow 16 may work with multiple integration entities 18.

The operation of the integration system 14 is explained below in two stages: initially, the operation of the integration system 14 is explained conceptually; and then, the operation of the integration system 14 is explained using an example. In general, the integration system 14 receives, from a first application, a workflow that conforms to a data structure of the first application; and analyzes the workflow to translate the workflow data into a different data structure of a second application as explained below in detail.

In FIG. 1, the business entities 10 contain the data that needs to be integrated with the external system 12 (the system that the business entities are trying to integrate with). The integration entities 18 parse a variety of data provided by the data flows 16 and communicate the data to the external system 12. The flow of data is as follows.

Data from the business entities 10 are passed to the integration entities 18 through simple user configurations (like workflows) shown as the data flows 16. The configurable data flows 16 allow the data to automatically enter the integration entities 18 at the right time (e.g., as a result of another action on the business entities 10, which is also selected when configuring the data flows 16 to trigger execution of the data flows 16). When the integration entities 18 receive the data, the integration entities 18 stage and process the data as explained below in detail, and then begin communication with the external system 12. The integration entities 18 may have an ability to retry failed events to ensure orderly delivery of data to the external system 12. Once the external system 12 receives the data sent to it from the integration system 14, in this manner, the business entities 10 are integrated with the external system 12.

Figure 2:
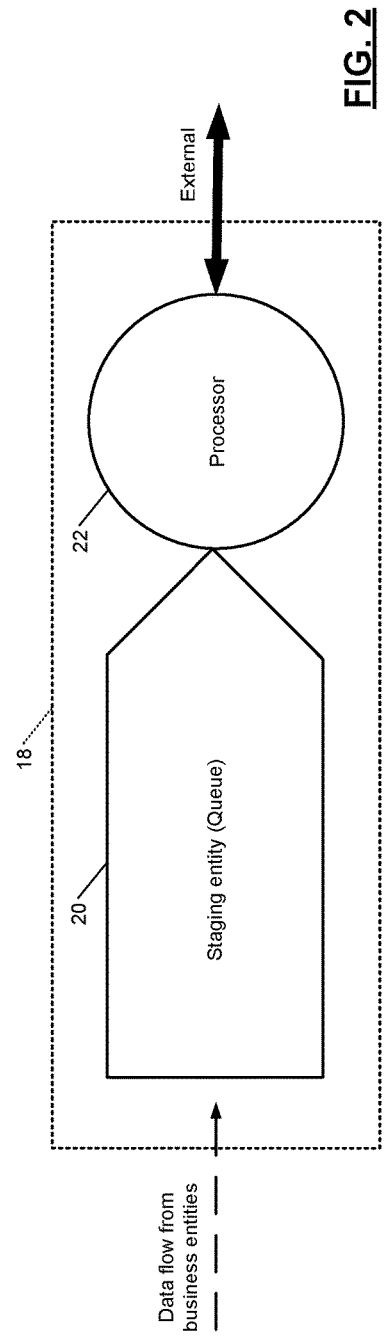
FIG. 2 shows a flow of data within each integration entity according to the present disclosure.

FIG. 2 shows the flow of data within each integration entity 18. Each integration entity 18 includes a staging entity (also called a queue) 20 and a processor (also called a plugin or code) 22. The data flowing into the integration system 14 is first stored in the staging entity 20. From the staging entity 20, the processor 22 retrieves each data set, converts the data set to the signature that the external system 12 understands, and sends the converted data set to the external system 12. The processor 22 performs most of the operations of data conversion and communication with the external system 12, including employing a fault-handling mechanism to retry a failed communication with the external system 12 as described below in detail.

Accordingly, the integration system 14 interfaces a business application (e.g., the business entities 10) to an external system (e.g., the external system 12). The integration system 14 functions as a middleware that handles the integration of data between the business application 10 and the external system 12. The integration system 14 includes configurable data flows 16 that send the data from the business application 10 to a queue 20 associated with an integration entity 18. A processor 22 of the integration entity 18 integrates the queued data and interfaces the business application 10 to the external system 12.

The integration system 14 has a modular architecture. The integration system 14 can reside in the business application 10 but can also be located outside the business application 10. The integration system 14 can be built into the business application 10 to utilize the processing capabilities and the workflows of the business application 10. The integration entities 18 can be located outside the business application 10 if the workflows of the business application 10 can be configured to push data into the integration entities 18 of the integration system 14.

FIG. 3 shows an example of configuring a data flow 16 to map an object of a business application 10 to an object of an external system 12 using a simple configuration or setup according to the present disclosure. For illustrative purposes only, Dynamics 365 is used as an example of the business system 10 that needs to interface with Glympse, which is used as an example of the external system 12. For example, the setup shows how a Bookable Resource record (e.g., associated with a field service technician) from Dynamics 365 can be mapped to a Glympse agent entity (i.e., the setup shows an example of the two disparate, but related concepts that need to be integrated).

To create a Glympse Agent for a Dynamics 365 object or entity called a Bookable Resource, all the user has to do is specify which fields of the Dynamics 365 Bookable Resource entity are to be mapped (e.g., Bookable Resource, Name, and E-mail shown on the right) to the respective fields of Glympse Agent integration entity that are exposed (shown on the left). Here, Bookable Resource is an entity, which is a collection of properties (e.g., Full Name, Primary Email, and so on) grouped under an object called Bookable Resource within the business application Dynamics 365, and which needs to be mapped to an entity or object called Glympse Agent of the external system Glympse via an integration entity also called Glympse Agent within the business application Dynamics 365.

Note that the user needs to specify minimal information for the entity that needs to be mapped to the external system 12. The user does not need to specify additional information (e.g., organization ID, and so on) about the entity that needs to be mapped to the external system 12. As explained below, the integration entity 18 acquires any additional information from Dynamics 365 and Glympse to fill in the rest of the information to complete the mapping instead of burdening the user with the task of providing all of the information to complete the mapping. Accordingly, configuring the data flow according to the present disclosure becomes a simple operation that can be completed based on the user's familiarity with, and knowledge of, the business application 10 and does not require any further training of the user to use the integration system 14. The user interacts with the integration system 14 with the knowledge and familiarity of the entities of the business application 10 and does not interact with complexities of an external integration system (e.g., BizTalk), which requires further user training. In addition, the integration system 14 is not hosted by a third party on a separate server (e.g., like MS Flow). Accordingly, the integration system 14 does not incur additional processing overhead and latency that is typically associated with an external integration system.

Further, the data flows 16 are configurable and can be adapted and reused to map any entity or object of one or more data processing systems within an enterprise to entities or objects of one or more data processing systems external to the enterprise (e.g., see FIG. 6 and corresponding description below). For example, the data flow shown in FIG. 3 can be adapted and reused to track Internet of Things (IoT) devices. All the user needs to do is, instead of selecting Bookable Resource, select an entity from an IoT module of a business application that is suitable for the tracking, and specify minimal information about the selected entity to be mapped to an external system. Accordingly, the integration system 14 is configurable and therefore flexible and extendible to other systems.

FIG. 4 further shows an example of how the user can configure when and how to execute a data flow 16. For example, the user can select when to start execution of the data flow 16 configured in FIG. 3 by specifying that the execution of the data flow 16 should be triggered when one or more of the following events occur: a record associated with the data flow 16 is created, or a field in the record is changed. Further, the user can select how to execute the data flow 16 once triggered. For example, the user can specify that the execution of the data flow 16 may occur in the background. The user can also select additional actions associated with the execution of the data flow 16, such as automatic deletion of completed data flow jobs to conserve storage, and so on. This data flow configuration and execution engine is only one example of a possible underlying data flow system, and is only described in detail in order to fully illustrate the flexibility of the solution.

Accordingly, the user can configure a data flow as shown in FIG. 3 and can select when and how to execute the data flow as shown in FIG. 4. Once the data flow is executed, a record is created based on the mapping specified in FIG. 3, and the record is queued in a queue 20 associated with an integration entity 18. A processor 22 associated with the integration entity 18 executes a plug-in (code) to acquire additional information from the backend and external systems. For example, the processor 22 retrieves additional information about the entity being mapped from the backend system. The processor 22 also obtains from the external system any additional information about the corresponding entity of the external system to which the mapping is being performed as well as information about the signature of the external system. The processor 22 combines the data from the record retrieved from the queue with the additionally acquired information and converts the resulting data into a format understood by the external system.

The plug-in of an integration entity is programmable. Accordingly, the plug-in of an integration entity can be programmed to process data from one or more business entities and to process data for one or more external systems (e.g., see FIG. 6 and corresponding description below). The configurability of the data flows 16 and the programmability of the integration entities 18 makes the integration system 14 modular and portable.

Figure 5A:
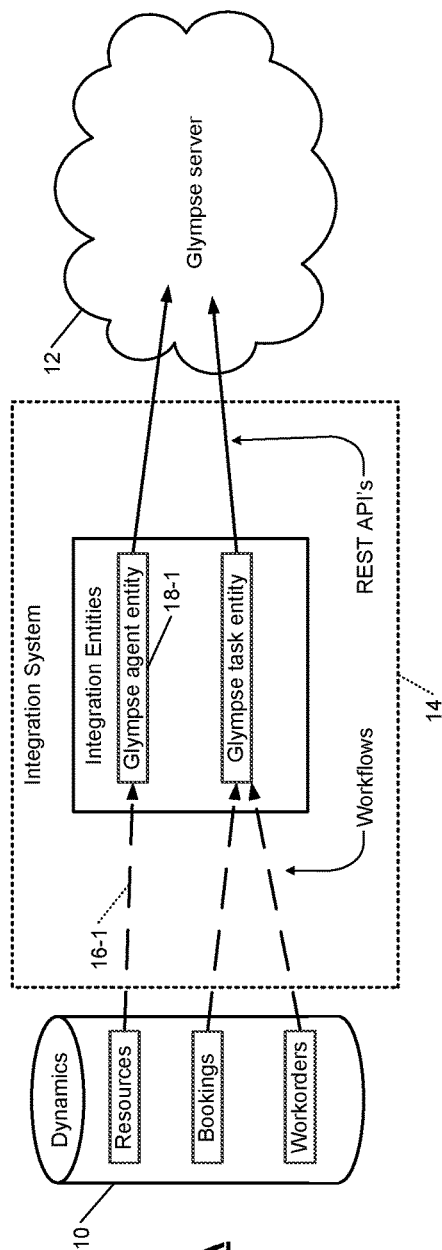
FIGS. 5A-5C illustrate the operation of the integration system in further detail using an example.
Figure 5B:
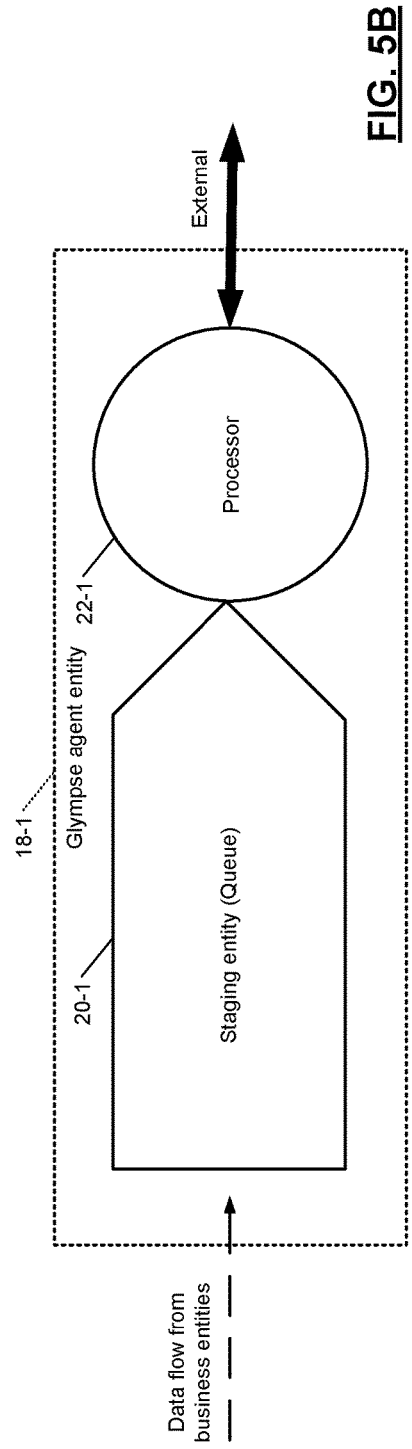
Figure 5C:
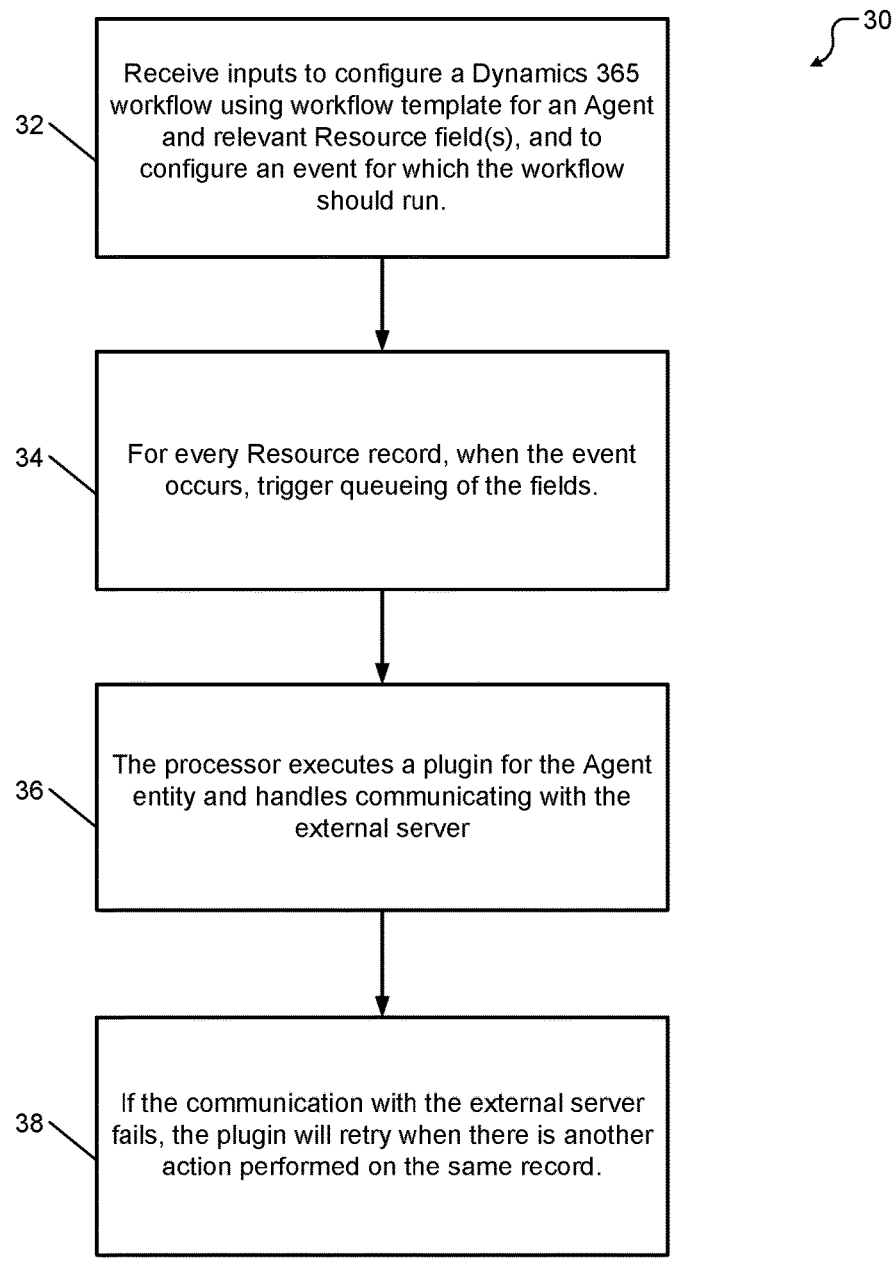

FIGS. 5A-5C illustrate the operation of the integration system 14 in further detail with the help of an example. Suppose that for every Resource entity in Dynamics 365, the user desires to create an Agent on the Glympse server and that the user desires to perform this operation using only some limited information from the Resource entity.

In FIG. 5A, the Agent on the Glympse server for the Resource entity in Dynamics 365 is called a Glympse Agent. The integration entity in the integration system 14 for mapping the Resource entity in Dynamics 365 to the Glympse Agent on the Glympse server is shown as the Glympse agent entity 18-1.

In FIG. 5B, the Glympse agent entity 18-1 includes a staging entity (queue) 20-1 and a processor 22-1. The user configures the workflow 16-1 to map the Resource to the Glympse Agent as explained above with reference to FIG. 3. Once the workflow is triggered as explained above with reference to FIG. 4, the integration system 14 executes code to create a record in the queue 20-1 to be processed by the processor 22-1. Before describing an example of the code, a general description of the flow executed by the integration system 14 follows.

FIG. 5C shows a flow 30 executed by the integration system 14 to map an object of a source system (e.g., Resource of Dynamics 365) to an object of an external system 12 (e.g., Glympse Agent of Glympse). At 32, inputs are received to configure a data flow 16-1 (e.g., a Dynamics 365 workflow) using a workflow template for the Agent and using relevant Resource entity field(s), and also to configure one or more action(s) or event(s) in response to which the data flow 16-1 may execute.

At 34, for every Resource entity record, when the one or more action(s) or event(s) occur, the selected fields are queued in the staging entity 20-1. At 36, the processor 22-1 executes a plugin (code) for mapping the Resource entity to the Glympse Agent entity. To complete the mapping, the code, an example of which is given below, collects additional fields from the business application 10 (Dynamics 365 in this example) and from the external system 12 (Glympse server in this example).

At 38, if the communication of the processor 22-1 with the external system 12 fails, the processor 22-1 will retry when another one of the selected actions is performed on the same record. In this manner, the Resource entity will be mapped to a Glympse Agent and will be sent to the Glympse system with a signature that the Glympse system understands. In this manner, the integration system 14 integrates the business application 10 (Dynamics 365 in this example) with the external system 12 (Glympse server in this example).

Below is an example of the mapping described above.

```
Agent                                             : BookableResource
    public int? Id                                : (no mapping)
        -> Retrieved value from Glympse server
    public string ForeignId                       : Id (automatic, not provided by user)
        -> Optional record Id (Dynamics 365 record Id)
    public string Name                            : Name
        -> Name of agent
    public string DisplayName                     : Defaulted to name, if none provided
        -> Display name of agent, if different
    public GlympseAgentConnection Connection      : (no mapping)
        -> Retrieved value of Username/Pwd from Glympse
    public string Email                           : Email of user of bookable resource
        -> Email of user related to bookable resource
    public string Type                            : Hard coded since type always the same
        -> Type of Glympse agent
    public string[ ] Roles                        : Hard coded since BR same permission
        -> Permissions on Glympse side
Task                                              : BookableResourceBooking
    public int? Id                                : (no mapping)
        -> Retrieved value from Glympse server
    public int? OrganizationId                    : Hard coded
        -> MS customers so MS specific org Id
```

```
public int? AgentId                                : Id from Mapping 1) for agent
public string ForeignId                            : Id (automatic, not provided by user)
      -> Optional record Id (Dynamics 365 record Id)
public string Description                          : Booking description
public Destination                                 : Work order address
      -> Address in Work order related to bookable resource booking
public long DueTimeMilliseconds                    : Converted booking due time (auto
calculated)
public DateTime DueTime                            : Booking due time
public long? StartTimeInMilliseconds;
public DateTime? StartTime                         : Booking start time
public GlympseTaskMetadata[ ]                      : Additional data from
public string InviteCode                           : no mapping, provided by Glympse
public GlympseTaskInviteContract Invite            : no mapping, provided by Glympse
public bool? Completed                             : (no mapping)
      -> Retrieved from Glympse
```

Below is an example of the code executed by the integration system 14 to perform the mapping described above. The integration system 14 takes in the parameters configured and acquired by the data flow, some of which are then used to gather data from the business system (a bookable resource), and some of which are directly passed to create a Glympse Agent entity.

```
public void CreateAgent(Guid bookableResourceId, string name, string
email)
{
    var bookableResource =
repository.RetrieveBookableResource(bookableResourceId);
    CreateAgent(bookableResource, name, email, null);
}
```

This subsequently triggers the processor 22-1 to fetch the record from the queue 20-1 and communicate with the external system 12. The following code (ExecuteCrmPlugin) uses standard coding patterns in Dynamics 365 to create the Glympse Agent entity, and then initialize the credentials of that newly created entity (integrating with the Glympse system 12 in the process; code not provided). A portion of the code (CreateAgent) actually creates the Web API call over HTTP with the necessary contractual data, sends that request to the Glympse system 12, and handles the response from the Glympse system 12, updating the integration entity with any relevant data. Comments follow "//".

```
protected override void ExecuteCrmPlugin(LocalPluginContext localContext)
{
    // Get entity for which we are trying to create agent
    var targetEntity =
localContext.GetTargetEntityFromInputParameters(GlympseAgent.EntityLogicalName);
    var clientFactory = localContext.GetCrmGlympseFactory( );
    var glympseAgentPlugin = new GlympseAgentController(localContext.GetRepository( ),
localContext.TracingService);
    // Create agent in Glympse server
    glympseAgentPlugin.CreateAgent(targetEntity, localContext.GetCrmGlympseFactory( ));
    var agent = localContext.SystemService.Retrieve(GlympseAgent.EntityLogicalName,
targetEntity.Id, new ColumnSet(GlympseAgent.AttributeMsdyn_foreignid,
GlympseAgent.AttributeMsdyn_agentid));
    // If agent was created successfully, save the username/password for this agent in
Dynamics 365
    if (agent != null)
    {
        glympseAgentPlugin.SetGlympseUsernamePassword(clientFactory.GetCrmGlympseC
lient( ), localContext.SystemService, agent.ToEntity<GlympseAgent>( ));
    }
}
public GlympseResponse<GlympseAgentDataContract> CreateAgent(string email, string name,
string foreignId, byte[ ] avatar)
{
    // Convert the Dynamics 365 entity to a Glympse data contract object
    var agent = GlympseAgentDataContract.Create(email, name, foreignId);
    // Serialize the data so it can be used by the web service call
    var postData = dataContractJsonSerializer.Serialize(agent);
    // Call glympse create agent web service
    var result =
glympseHttpRequestProxy.Post<GlympseAgentDataContract>(GetBearerToken( ),
glympseRestApiEndpointUri.CreateAgent(glympseSettings.GetOrganizationId( )), postData);
    // If the user has an avatar, update the agent created from the call above with an avatar
    if (avatar != null)
    {
```

```
        glympseHttpRequestProxy.Post<object>(GetBearerToken( ),
glympseRestApiEndpointUri.UpdateAvatar(result.Body.Id.GetValueOrDefault( )), avatar);
        }
    return result;
}
```

The italicized portion of the code above shows how the processor 22-1 makes a REST call to the Glympse server 12 to create the Glympse Agent for the specified entity record.

Referring back to FIG. 3, the only fields exposed to the user are: Bookable Resource, Agent name, and Agent e-mail. The processor 22-1 maps the fields to the following contract (definition of contract follows), which is serialized and sent to the Glympse server with the signature that Glympse understands. In design by contract, which is an approach used to building reusable systems (e.g., the integration system 14), a software system (e.g., the integration system 14) is viewed as a set of communicating components whose interaction is based on precisely defined specifications of the mutual obligations, also known as contracts. The processor 22-1 maps the fields to the following contract (comments follow "H"):

```
namespace
Microsoft.Dynamics.Glympse.Common.Glympse.DataContracts
{
    using System;
    using System.Runtime.Serialization;
    using Extensions;
    [DataContract]
    public class GlympseAgentDataContract
    {
        [DataMember(Name = "_id", EmitDefaultValue = false)]
        public int? Id { get; set; }
        [DataMember(Name = "foreign_id", EmitDefaultValue = false)]
        public string ForeignId { get; set; }
        [DataMember(Name = "name")]
        public string Name { get; set; }
        [DataMember(Name = "display_name", EmitDefaultValue = false)]
        public string DisplayName { get; set; }
        [DataMember(Name = "glympse", EmitDefaultValue = false)]
        public GlympseAgentConnection Connection { get; set; }
        [DataMember(Name = "email", EmitDefaultValue = false)]
        public string Email { get; set; }
        [DataMember(Name = "type", EmitDefaultValue = false)]
        public string Type { get; set; }
        [DataMember(Name = "roles", EmitDefaultValue = false)]
        public string[ ] Roles { get; set; }
        // Code for mapping of Dynamics 365 entity to Glympse server
        public static GlympseAgentDataContract Create(string email,
        string name, string foreignId)
        {
            var agent = new GlympseAgentDataContract( );
            agent.Name = name;
            agent.Email = email;
            agent.ForeignId = foreignId;
            agent.Initialize( );
            return agent;
        }
        public void Initialize( )
        {
            DisplayName = Name;
            Roles = new string[1] {
            GlympseAgentRole.agent.ToString( ) };
            Type = GlympseAgentType.tracking.ToString( );
        }
    }
}
```

Note that in the above example, the user only provides 3 fields and a yes/no selection. The rest of the fields are populated by the processor 22-1, which retrieves this information from various entities associated to the Glympse setup and the 3 fields provided above. As an example, the GlympseAgentConnection in above code is obtained from a Glympse settings entity, which stores a set of Glympse-related authentication information.

The processor 22-1 maps the fields on Glympse side as follows (comments follow "//"):

```
public class CreateGlympseAgentForBookableResource: WorkFlowActivityBase
{
    [RequiredArgument]
    [Input("Bookable Resource")]
    [ReferenceTarget("bookableresource")]
    public InArgument<EntityReference> BookableResourceCreated { get; set; }
    [Input("Load User Image as Agent Avatar")]
    [Default("False")]
    public InArgument<bool> LoadUserImageAsAgentAvatar { get; set; }
    [RequiredArgument]
    [Input("Agent Name")]
    public InArgument<string> AgentName { get; set; }
    [RequiredArgument]
    [Input("Agent E-mail")]
    public InArgument<string> AgentEmail { get; set; }
    /// <summary>
    /// Executes the WorkFlow.
    ///</summary>
    public override void ExecuteCRMWorkFlowActivity(CodeActivityContext executionContext,
    LocalWorkflowContext crmWorkflowContext)
    {
            var       bookableResourceWorkflow       =       new
    BookableResourceController(crmWorkflowContext.GetRepository( ),
    crmWorkflowContext.TracingService);
            if (LoadUserImageAsAgentAvatar.Get(executionContext))
            {
```

```
        bookableResourceWorkflow.CreateAgentWithAvatar(BookableResourceCreated.Get(exec
utionContext).Id, AgentName.Get(executionContext), AgentEmail.Get(executionContext));
            }
            else
            {
bookableResourceWorkflow.CreateAgent(BookableResourceCreated.Get(executionContext).Id,
AgentName.Get(executionContext), AgentEmail.Get(executionContext));
            }
        }
    }
```

In FIG. 3, in another example, an additional option may be presented to the user to allow the user to map an additional property (e.g., load an image avatar). The additional property may or may not be supported by the external system. If the user selects yes, the code retrieves the information from the "user" entity associated with the record provided. In other words, the user may map more properties than those supported by the external system 12 (called over-mapping). The property or properties not be supported by the external system 12 may be dropped (i.e., may not mapped to the external system 12) during runtime. Optionally, the code may return message(s) to notify the user of the dropped properties.

Accordingly, the integration system 14 can integrate any system to any other system using the combination of configurable data flows and modular/portable integration entities (e.g., see FIG. 6 and corresponding description below). Following are some of the advantages of the integration system 14. First, other than a data flow that is configurable through workflows or something similar within a back-end business system (e.g., an ERP or CRM application) of an enterprise, the integration system 14 has minimal coupling between the integration entities 18 and the back-end business system. Second, the integration system 14 involves a lightweight implementation compared to custom-written code that may be alternatively used to integrate two applications since the integration system 14 basically includes two components—the data entities and the processor. Third, the integration system 14 has a built-in ability to configure which parts of the back-end system should integrate to the external system, at what time(s), and in what way, which is determined by the data flow that is configured to input data into the integration system. Fourth, the integration system 14 has a built-in ability to configure the mapping of data in the external system to the enterprise system data. Fifth, the integration system 14 has a built-in ability to deliver data from the business entity to the external system in an orderly manner. Sixth, the integration system 14 has a built-in ability to retry failed communications with the external system. Seventh, the integration system 14 is a modular system allowing for additional business entities to integrate with the external system simply by configuring the data flows.

The teachings of the present disclosure can be extrapolated and easily applied to any business application software like Salesforce, SAP, Oracle, Dynamics AX, Dynamics CRM, etc. that is being integrated with an external third-party party system. The approach according to the present disclosure is not only efficient both from financial and effort standpoints as well as from speed and performance standpoints, but can also be reused by any extensions or customizations on top of the business application software as a platform (Dynamics CRM solutions, for example).

Figure 6:
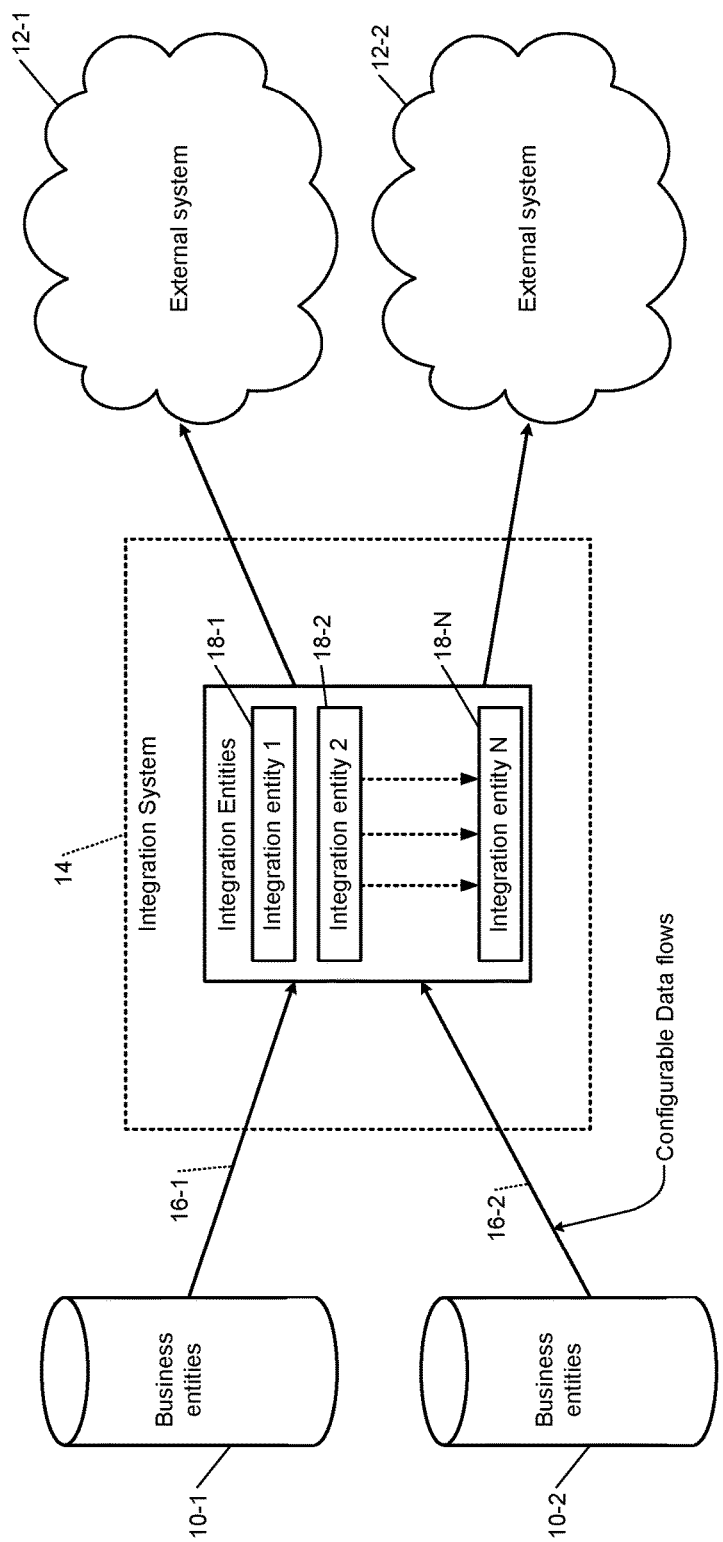
FIG. 6 shows an additional example of the integration system according to the present disclosure.

FIG. 6 shows examples of additional configurations of the systems and methods according to the present disclosure. For example, the integration system 14 can integrate a plurality of business applications 10-1, 10-2 with a plurality of external systems 12-1, 12-2 as explained in detail below. While FIG. 6 shows only two business applications and only two external systems for illustrative purposes, the above teachings can apply to additional business applications and additional external systems as wells as to integrating any business application with any external system in the manner explained above.

These multi-system multi-entity configurations are possible because of the configurability of the data flows and the modularity/portability of the integration entities as described above. Specifically, the data flows are configurable and can be adapted and reused to map any entity or object of one or more data processing systems within an enterprise to entities or objects of one or more data processing systems external to the enterprise as described above. Further, since the plug-ins of the integration entities are programmable as explained above, the plug-ins of the integration entities can be programmed to process data from one or more business entities as well as to process data for one or more external systems. The combination of the configurable data flows and the modular/portable integration entities make it possible for the integration system 14 to integrate any system to any other system as explained above. Below are some examples of these additional multi-system multi-entity configurations that are possible due to the combination of the configurable data flows and the modular/portable integration entities.

For example, the integration system 14 can integrate two different objects or entities of the same business application (e.g., a first business application 10-1) to two different objects or entities of two different external systems 12-1, 12-2. That is, the integration system 14 can map a first object or entity of the first business application 10-1 to a second object or entity of a first external system 12-1 and can map a third object or entity of the first business application 10-1 to a fourth object or entity of a second external system 12-2.

Further, the integration system 14 can integrate two different objects or entities of two different business applications 10-1, 10-2 to two different objects or entities of the same external system (e.g., the first external system 12-1). That is, the integration system 14 can map a first object or entity of the first business application 10-1 and a second object or entity of the second business application 10-2 respectively to a third object or entity of the first external system 12-1.

Further, the integration system 14 can integrate two different objects or entities of two different business applications 10-1, 10-2 to two different objects or entities of two different external systems 12-1, 12-2. That is, the integration system 14 can map a first object or entity of the first business application 10-1 and a second object or entity of the second business application 10-2 respectively to a third object or entity of the first external system 12-1 and a forth object or entity of the second external system 12-2. Additional examples of multi-system multi-entity configurations are contemplated.

Below are simplistic examples of a distributed computing environment in which the systems and methods of the present disclosure can be implemented. Throughout the description, references to terms such as servers, client devices, applications and so on are for illustrative purposes only. The terms servers and client devices are to be understood broadly as representing computing devices comprising one or more processors and memory configured to execute machine readable instructions. The terms applications and computer programs are to be understood broadly as representing machine readable instructions executable by the computing devices.

Figure 7:
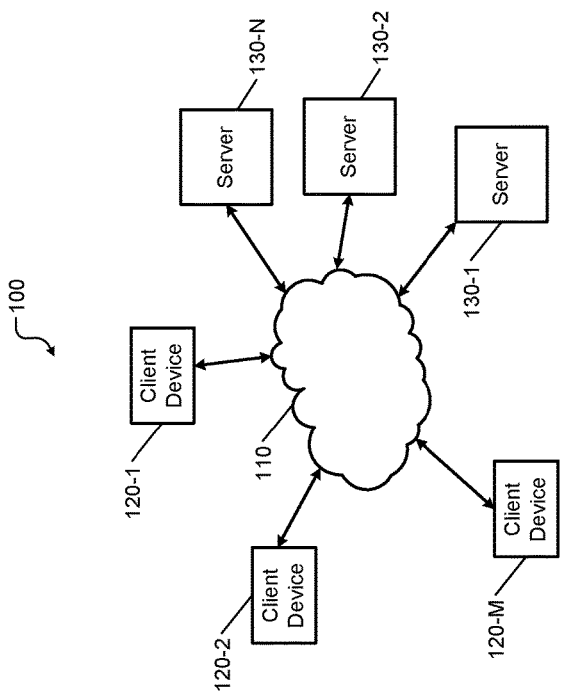
FIG. 7 is a functional block diagram of an example of a distributed network system including multiple servers providing services including the integration system of the present disclosure to multiple client devices.

FIG. 7 shows a simplified example of a distributed network system 100 of an enterprise. The distributed network system 100 includes a network 110, client devices 120-1, 120-2, . . . , and 120-M (collectively client devices 120) (where M is an integer greater than or equal to one), and servers 130-1, 130-2, . . . , and 130-N (collectively servers 130) (where N is an integer greater than or equal to one). The network 110 may include a local area network (LAN), a wide area network (WAN) such as the Internet, or other type of network (collectively shown as the network 110). One or more of the servers 130 may be located at different departments and different geographical locations of the enterprise. At least one of the servers 130 (e.g., server 130-1) may be located external to, and remote from, the enterprise and the server(s) 130 of the enterprise.

The client devices 120 communicate with the server 130 via the network 110. The client devices 120 and the server 130 may connect to the network 110 using wireless and/or wired connections to the network 110. For example, the client devices 120 may include smartphones, personal digital assistants (PDAs), laptop computers, personal computers (PCs), and so on.

The one or more servers 130 of the enterprise may provide multiple services to the client devices 120. For example, the one or more servers 130 of the enterprise may execute one or more software applications or data processing systems (e.g., Dynamics 365). The one or more servers 130 of the enterprise may host multiple databases that are utilized by the one or more software applications and that are used by users of the client devices 120. The one or more applications running on the one or more servers 130 of the enterprise may need to communicate and integrate with one or more applications running on the server 130-1 external to the enterprise. The one or more applications running on the one or more servers 130 of the enterprise may include the integration system 14 described above with reference to FIGS. 1-6. The integration system 14 running on the one or more servers 130 of the enterprise may integrate the one or more applications running on the one or more servers 130 of the enterprise with one or more applications running on the server 130-1 external to the enterprise as described above with reference to FIGS. 1-6.

Figure 8:
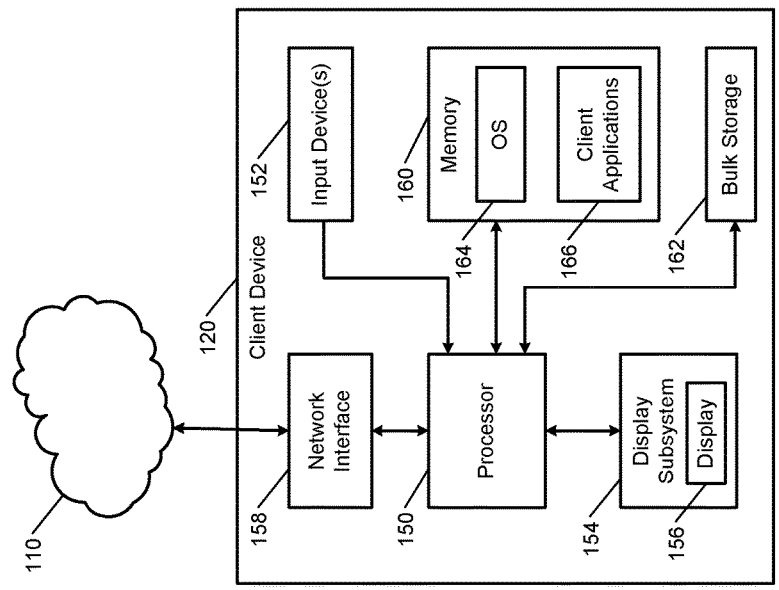
FIG. 8 is a functional block diagram of an example of a client device.

FIG. 8 shows a simplified example of the client device 120. The client device 120 may typically include a central processing unit (CPU) or processor 150, one or more input devices 152 (e.g., a keypad, touchpad, mouse, and so on), a display subsystem 154 including a display 156, a network interface 158, a memory 160, and a bulk storage 162.

The network interface 158 connects the client device 120 to the distributed network system 100 via the network 110. For example, the network interface 158 may include a wired interface (e.g., an Ethernet interface) and/or a wireless interface (e.g., a Wi-Fi, Bluetooth, near field communication (NFC), or other wireless interface). The memory 160 may include volatile or nonvolatile memory, cache, or other type of memory. The bulk storage 162 may include flash memory, a hard disk drive (HDD), or other bulk storage device.

The processor 150 of the client device 120 executes an operating system (OS) 164 and one or more client applications 166. The client applications 166 include an application to connect the client device 120 to the one or more servers 130 of the enterprise via the network 110. The client device 120 accesses the one or more applications and the integration system 14 executed by the one or more servers 130 of the enterprise via the network 110.

Figure 9:
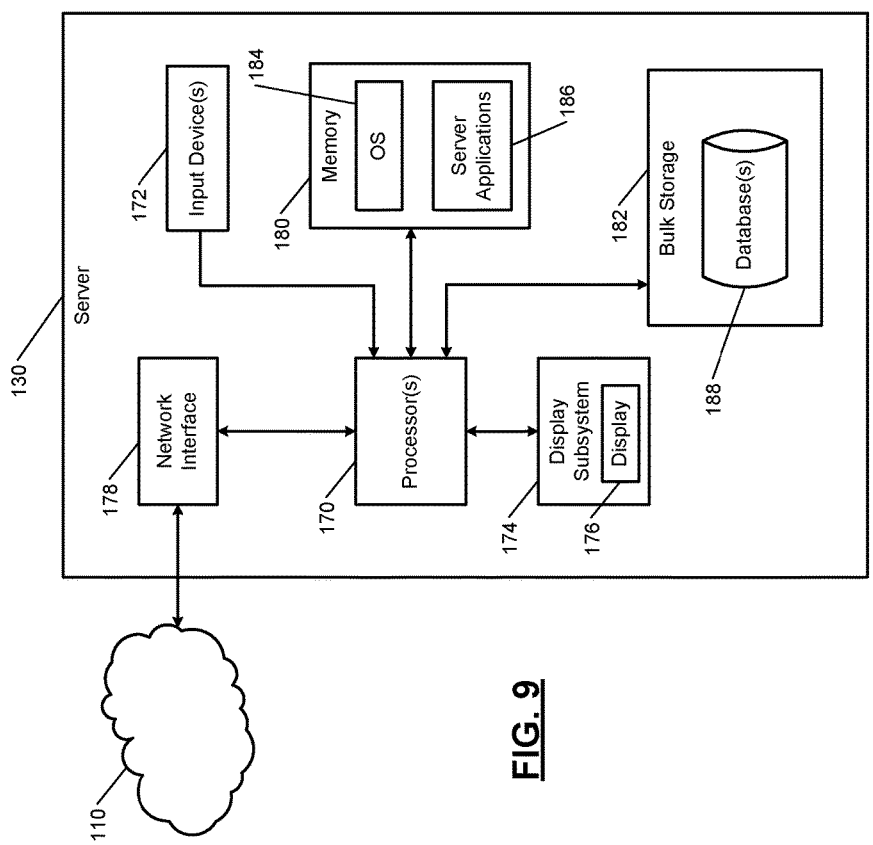
FIG. 9 is a functional block diagram of an example of a server.

FIG. 9 shows a simplified example of each of the servers 130. Each server 130 typically includes one or more CPUs or processors 170, one or more input devices 172 (e.g., a keypad, touchpad, mouse, and so on), a display subsystem 174 including a display 176, a network interface 178, a memory 180, and a bulk storage 182.

The network interface 178 connects each server 130 to the distributed network system 100 via the network 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more hard disk drives (HDDs), or other bulk storage device.

The processor 170 of each server 130 executes an operating system (OS) 184 and one or more server applications 186. For the one or more servers 130 of the enterprise, these one or more server applications 186 include backend systems (e.g., Dynamics 365) and the integration system 14 described above with reference to FIGS. 1-6. For the server 130-1 external to the enterprise, these one or more server applications 186 may include applications with which the backend systems of the enterprise need to communicate. The bulk storage 182 may store one or more databases 188 that store data structures used by the server applications 186 to perform respective functions.

Figure 10:
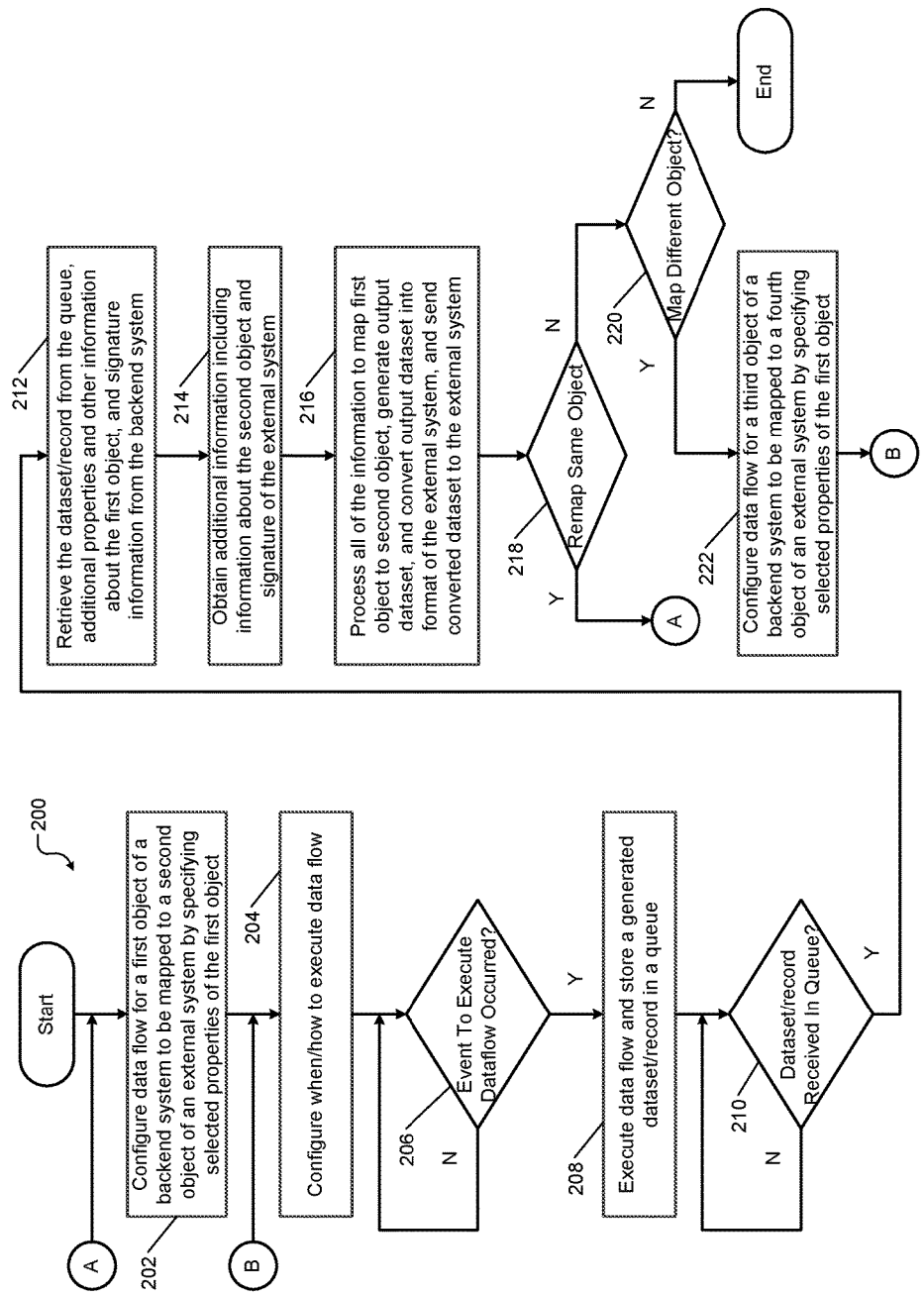
FIG. 10 is a flowchart of a method for integrating a business application of an enterprise to an external system according to the present disclosure.

FIG. 10 shows an example of a method 200 for integrating a business application (e.g., a backend system) of an enterprise to a different application that is external to the enterprise (external system). The method 200 and the control referenced below in the description of the method 200 may be executed by the integration system 14 on the one or more servers 130 of the enterprise.

At 202, control receives inputs to configure a data flow for a first object of a backend system of an enterprise that is to be mapped to a second object of an external system to the enterprise. Control uses the inputs to configure the data flow by specifying only a few selected properties and not all of the properties of the first object. At 204, control also uses the inputs to configure when and how the data flow will be executed. For example, one of the inputs received specifies one or more events or conditions based on the occurrence of which the data flow will execute. Further, one of the inputs received also specifies the environment (e.g., in the background) in which the data flow will execute when the one or more events or conditions occurs. The inputs may further specify other actions such as deleting a job after completion to conserve memory.

At 206, control determines whether the specified event or condition for executing the data flow has occurred. At 208, if the specified event or condition for executing the data flow has occurred, control executes the data flow in the specified manner, generates a dataset/record, and inputs the dataset/record into a queue.

At 210, control determines whether a dataset/record has been received in the queue. At 212, if a dataset/record has been received in the queue, control retrieves the dataset/record from the queue. Additionally, control retrieves additional properties and other information about the first object and signature information from the backend system. At 214, control obtains from the external system additional information including information about the second object and information about the signature of the external system.

At 216, control processes all of the above information including the dataset/record and all of the additional information acquired from the backend system and the external system to map the first object to the second object and generates an output dataset to be sent to the external system. Control converts the output dataset into a format compatible with the external system and sends the converted output dataset to the external system.

At 218, control determines whether to remap the same object to another object of the external system (i.e., if additional inputs are received for mapping the same object of the backend system to another object of the external system). Control returns to 202 if the same object is to be remapped. At 220, if the same object is not be remapped, control determines whether a different object of the backend system is to be mapped to another object of the external system (i.e., if additional inputs are received for mapping a different object of the backend system to another object of the external system). Control ends if a different object is not to be remapped. At 222, if a different object of the backend system is to be mapped to another object of the external system, control uses additional inputs received for mapping a different object of the backend system to another object of the external system to reconfigure the data flow similar to the manner of configuring a dataset as described at 202; and control returns to 204.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory is a subset of the term computer-readable medium or machine-readable medium. The term computer-readable medium or machine-readable medium, as used herein, does not encompass transitory electrical or electromagnetic signals propagating through a medium (such as on a carrier wave); the term computer-readable medium or machine-readable medium may therefore be considered tangible and non-transitory. Non-limiting examples of a non-transitory, tangible computer-readable medium or machine-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system for integrating data processing systems, the system comprising:
   a processor and memory; and
   machine readable instructions stored in the memory, when executed by the processor, configured to:
      configure data flow for a first object of a first data processing system;
         in response to an occurrence of an event, execute the data flow to generate a first set based on the execution;
         store the generated first data set in a queue;
         retrieve the first data set from the queue and additional information about the first object and signature information of the first processing system;
         obtain information about a second object and signature information of a second processing system;
         process, the first data set, the additional information, the signature information of the first processing system, the information about the second object, and the signature information of the second processing system, to map the first object to the second object;
         generate, based on the mapping of the first object to the second object, an output data set in a format compatible with the second processing system;
         determine whether to remap the first object to another object of the second processing system; and
         in response to determining to remap the first object to the another object, remap the first object to the another object of the second processing system based on the configure, store, retrieve, obtain, process and generate steps performed for mapping the first object to the another object.

2. The machine readable instructions of the system of claim 1 are further configured to retry a failed communication with the second data processing system.

3. The machine readable instructions of the system of claim 1 wherein the additional information about the first object includes additional properties of the first object.

4. The machine readable instructions of the system, of claim 1 are further configured to:
   generate a first plurality of data sets by executing a plurality of data flows in an order;
   generate a second plurality of data sets by processing the first plurality of data sets in the order; and
   send the second plurality of data sets to the second data processing system in the order.

5. The machine readable instructions of the system of claim 1 are further configured to map a third object of third type of the first data processing system to a fourth object of fourth type of a third data processing system using the reconfigured data flow.

6. The machine readable instructions of the system of claim 1 are further configured to map a third object of third type of a third data processing system to a fourth object of fourth type of the second data processing system using the reconfigured data flow.

7. The machine readable instructions of the system of claim 1 are further configured to map a third object of third type of a third data processing system to a fourth object of fourth type of a fourth data processing system using the reconfigured data flow.

8. A method for integrating a first processing system and a second processing system, the method comprising:
   configuring a data flow for a first object of the first data processing system;
   in response to an occurrence of an event, executing the data flow to generate a first data set based on the execution;
   storing the generated first data set in a queue;
   retrieving the first data set from the queue and additional information about the first object and signature information of the first processing system;
   obtaining information about a second object and signature information of the second processing system;
   processing, the first data set, the additional information, the signature information of the first processing system, the information about the second object, and the signature information of the second processing system, to map the first object to the second object;
   generating, based on the mapping of the first object to the second object, an output data set in a format compatible with the second processing system;
   determining whether to remap the first object to another object of the second processing system; and
   in response to determining to remap the first object to the another object, remapping the first object to the another object of the second processing system based on the configuring, storing, retrieving, obtaining, processing and generating steps performed for mapping the first object to the another object.

9. The method of claim 8 wherein the signature information for the first or second processing system includes data used by the first or second processing system to communicate with other data processing systems.

10. The method of claim 8 further comprising retrying a failed communication with the second data processing system.

11. The method of claim 8 further comprising:
   generating a first plurality of data sets by executing a plurality of data flows in an order;
   generating a second plurality of data sets by processing the first plurality of data sets in the order; and
   sending the second plurality of data sets to the second data processing system in the order.

12. The method of claim 8 further comprising mapping a third object of third type of the first data processing system to a fourth object of fourth type of a third data processing system using the reconfigured data flow.

13. The method of claim 8 further comprising mapping a third object of third type of a third data processing system to a fourth object of fourth type of the second data processing system using the reconfigured data flow.

14. The method of claim 8 further comprising mapping a third object of third type of a third data processing system to a fourth object of fourth type of a fourth data processing system using the reconfigured data flow.

15. A first server configured to host a first data processing system and to communicate with a second server hosting a second data processing system, the first server comprising:
   a processor and memory; and
   machine readable instructions stored in the memory, when executed by the processor, configured to:
      configure a data flow for a first object of the first data processing system;
      in response to an occurrence of an event, execute the data flow to generate a first data set based on the execution;
      store the generated first data set in a queue;
      retrieve the first data set from the queue and additional information about the first object and signature information of the first processing system;
      obtain information about a second object and signature information of the second processing system;
      process, the first data set, the additional information, the signature information of the first processing system, the information about the second object, and the signature information of the second processing system, to map the first object to the second object;
      generate, based on the mapping of the first object to the second object, an output data set in a format compatible with the second processing system;
      determine whether to remap the first object to another object of the second processing system; and
      in response to determining to remap the first object to the another object, remap the first object to the another object of the second processing system based on the configure, store, retrieve, obtain, process and generate steps performed for mapping the first object to the another object.

16. The machine readable instructions of the first server of claim 15 are further configured to retry a failed communication with the second data processing system.

17. The machine readable instructions of the first server of claim 15 are further configured to:
   generate a first plurality of data sets by executing a plurality of data flows in a sequential order;
   generate a second plurality of data sets by processing the first plurality of data sets in the sequential order; and
   send the second plurality of data sets to the second data processing system in the sequential order.

18. The machine readable instructions of the first server of claim 15
   wherein the remapping of the first object to the another object is performed using reconfigured data flow.

* * * * *